United States Patent [19]

Miller et al.

[11] Patent Number: 4,821,922
[45] Date of Patent: Apr. 18, 1989

[54] THERMOPLASTIC MELTING APPARATUS WITH A LEVEL INDICATOR

[75] Inventors: Scott R. Miller, Roswell; Robert A. Dunn, Marietta, both of Ga.

[73] Assignee: Nordson Corporation, Amherst, Ohio

[21] Appl. No.: 114,437

[22] Filed: Oct. 29, 1987

[51] Int. Cl.$^4$ .................. G01G 13/00; G01G 17/04
[52] U.S. Cl. .......................... 222/77; 222/52; 222/56; 222/146.2; 222/146.5; 177/184; 220/259
[58] Field of Search ............... 222/146.5, 146.2, 146.4, 222/56, 58, 77, 55; 220/256, 259; 177/184; 417/37, 362

[56] References Cited

U.S. PATENT DOCUMENTS

| | | | |
|---|---|---|---|
| 1,178,553 | 4/1916 | Tannewitz | 220/259 |
| 3,377,466 | 4/1968 | Paulsen | 219/421 |
| 3,792,801 | 2/1974 | Baker et al. | 222/146.5 |
| 3,815,788 | 6/1974 | Reighard et al. | 222/146.5 |
| 3,827,603 | 8/1974 | Reighard et al. | 222/146.5 |
| 3,876,105 | 4/1975 | Kelling | 222/56 |
| 3,964,645 | 6/1976 | Scholl | 222/146.5 |
| 3,981,416 | 9/1976 | Scholl | 222/334 X |
| 4,073,409 | 2/1978 | Gardner et al. | 222/146.5 |
| 4,227,069 | 10/1980 | Gardner et al. | 222/146.5 |
| 4,447,707 | 5/1984 | Baker | 219/301 |
| 4,455,474 | 6/1984 | Jameson et al. | 219/301 |
| 4,456,151 | 6/1984 | Lewellen | 222/146.5 |
| 4,474,311 | 10/1984 | Petrecca | 222/146.5 |
| 4,485,941 | 12/1984 | Frates et al. | 222/146.5 |
| 4,485,942 | 12/1984 | Petrecca | 222/146.5 |
| 4,667,850 | 5/1987 | Scholl et al. | 222/146.5 X |

FOREIGN PATENT DOCUMENTS 1584323 10/1969 Fed. Rep. of Germany ........ 222/56
581317 10/1976 Switzerland ........................ 222/58

Primary Examiner—Joseph J. Rolla
Assistant Examiner—Steve Reiss
Attorney, Agent, or Firm—Wood, Herron & Evans

[57] ABSTRACT

A thermoplastic melting apparatus comprises a tank pivotally mounted upon bearings within the interior of a housing having a top cover. A load cell is mounted beneath the tank opposite the bearings which is effective to sense pivotal movement of the tank as it is loaded with and/or emptied of thermoplastic material, and to produce a signal which indicates the quantity of thermoplastic material within the tank. The load cell is isolated from dynamic forces produced by drive linkages which operate pumps associated with the tank, by positioning the pivot axis of the bearings in the same plane as the force produced by the drive linkage. The lid of the tank is isolated from the top cover of the housing to prevent the transmittal of forces to the tank from objects placed on the top cover of the housing or the like.

10 Claims, 2 Drawing Sheets

THERMOPLASTIC MELTING APPARATUS WITH A LEVEL INDICATOR

FIELD OF THE INVENTION

This invention relates to thermoplastic melting apparatus, and, more particularly, to a thermoplastic melting apparatus having a level indicator for measuring the quantity of thermoplastic material within the hopper or tank of the apparatus.

BACKGROUND OF THE INVENTION

Thermoplastic materials or so-called "hot melt" materials such as hot melt adhesives are stored in solid form and must be converted to the molten state before they can be supplied to applicators or dispensers. Commercially available thermoplastic melting apparatus generally include a hopper or tank having an open top for receiving solid thermoplastic material, heating elements mounted in the walls or at the bottom of the tank to convert the solid thermoplastic material to the molten state, a reservoir and/or manifold for receiving the molten material and a pump for pumping the molten material from the reservoir and/or manifold to one or more dispensers.

The tank which receives the solid thermoplastic material is normally enclosed within a housing having a cover plate for sealing its open top. The open top of the tank is closed by a lid to prevent contamination of the atmosphere and to avoid exposure of the thermoplastic material to air, which, particularly with hot melt adhesive, can cause oxidation and charring of the material. Both the cover plate and tank lid are removable in order to permit periodic loading of additional solid thermoplastic material into the tank.

Because the contents of the tank are hidden from view by the tank lid and housing cover plate, a level indicator must be provided in order to allow the operator to determine when the tank should be refilled with solid thermoplastic material. In the prior art, level indicators have been mounted within the interior of the tank and are directly exposed to the thermoplastic material therein. These level indicators have proven unreliable, particularly in measuring levels of viscous thermoplastic material such as hot melt adhesive.

One reason for inaccurate measurements by prior art level indicators is they lack the sensitivity to differentiate between the states of the thermoplastic material within the tank, i.e., solid or liquid. This can be a particular problem in melting apparatus having a grid melter or the like at the bottom of the tank wherein the thermoplastic material is in molten or liquid form in the area of the melter but in solid form above the melter. Another problem with prior art level indicators is that they may be sensitive to the temperature within the tank which can vary substantially depending upon the type of thermoplastic material heated therein. Additionally, prior art level indicators may provide an inaccurate reading for thermoplastic materials having different viscosities.

SUMMARY OF THE INVENTION

It is therefore among the objectives of this invention to provide a thermoplastic melting apparatus having a level indicator for measuring the quantity of thermoplastic material within the tank or hopper of a melting device which is unaffected by conditions within the interior of the tank or properties of the thermoplastic material located in the tank and which provides accurate measurements of the total quantity of thermoplastic material therein.

These objectives are accomplished in a level indicator for a thermoplastic melting apparatus in which one side of the bottom of the tank for receiving thermoplastic material is mounted on pivots and the opposite side is carried by a load cell positioned exteriorly of the tank. The tank is rotatable with respect to the pivots and applies a force to the load cell which is proportionate to the quantity or weight of thermoplastic material contained therein. In response to such force, the load cell produces a signal which provides a measurement of the quantity of material in the tank.

This invention is predicated upon the concept of providing an accurate measurement of the quantity of thermoplastic material within the tank of a thermoplastic melting device wherein the level indicator is isolated from the conditions in the interior of the tank. Accurate measurement of the level of thermoplastic material within the tank is ensured by minimizing the effect of external forces on the tank so that only the contents of the tank are measured by the load cell.

External forces can be applied to the tank in at least two ways. First, in the presently preferred embodiment, the thermoplastic melting apparatus includes a tank which is connected to and supports a reservoir, manifold and one or more gear pumps. Molten material from the tank enters the reservoir and is pumped by the gear pump into the manifold and then to one or more dispensers. The gear pump has an output shaft which is driven by an endless belt or chain linkage connected to a motor and/or gear reducer. Because the pump is supported by the tank, while the motor is supported independently of this tank, motion of the drive linkage between the motor and pump would ordinarily apply a force to the tank acting along the run of the drive linkage. If this drive force is sensed by the load cell, an inaccurate measurement of the contents of the tank would be produced.

In order to eliminate the effect on the load cell of the force component produced by the drive linkage between the motor and pump, the pivots mounted on one side of the hopper are positioned in direct alignment, i.e., within the same plane, as the run of the drive linkage between the motor and pump. The dynamic force produced by motion of the drive linkage therefore acts directly through the pivots for the tank which transfer such force to the frame of the melting device so that it is not applied to the load cell.

A second source of potentially inaccurate readings from the load cell are external forces applied to the tank. In a presently preferred embodiment, the tank is completely contained within a housing having an open top which is enclosed by a cover. This housing cover is carried at one end by a hinge mounted directly to a frame element of the melting apparatus which is not connected to the tank, and the opposite end of the housing cover rests upon one or more rubber pads also connected to a frame element of the melting apparatus.

The tank lid is connected to the housing cover so that it can be lifted therewith for loading the tank with solid thermoplastic material, but this connection permits the tank lid to slide or float with respect to the housing cover to isolate it from forces applied to the housing cover. Such forces might, for example, be derived from tools or other objects placed atop the cover. In a presently preferred embodiment, the tank lid is mounted to the housing cover with slotted brackets. Movement of the housing cover relative to the tank lid is permitted along the slot formed in the bracket so that no forces are transmitted through the tank lid and tank to the load cell.

DESCRIPTION OF THE DRAWINGS

The structure, operation and advantages of the presently preferred embodiment of this invention will become further apparent upon consideration of the following description taken in conjunction with the accompanying drawings, wherein.

DETAILED DESCRIPTION OF THE INVENTION

Figure 1:
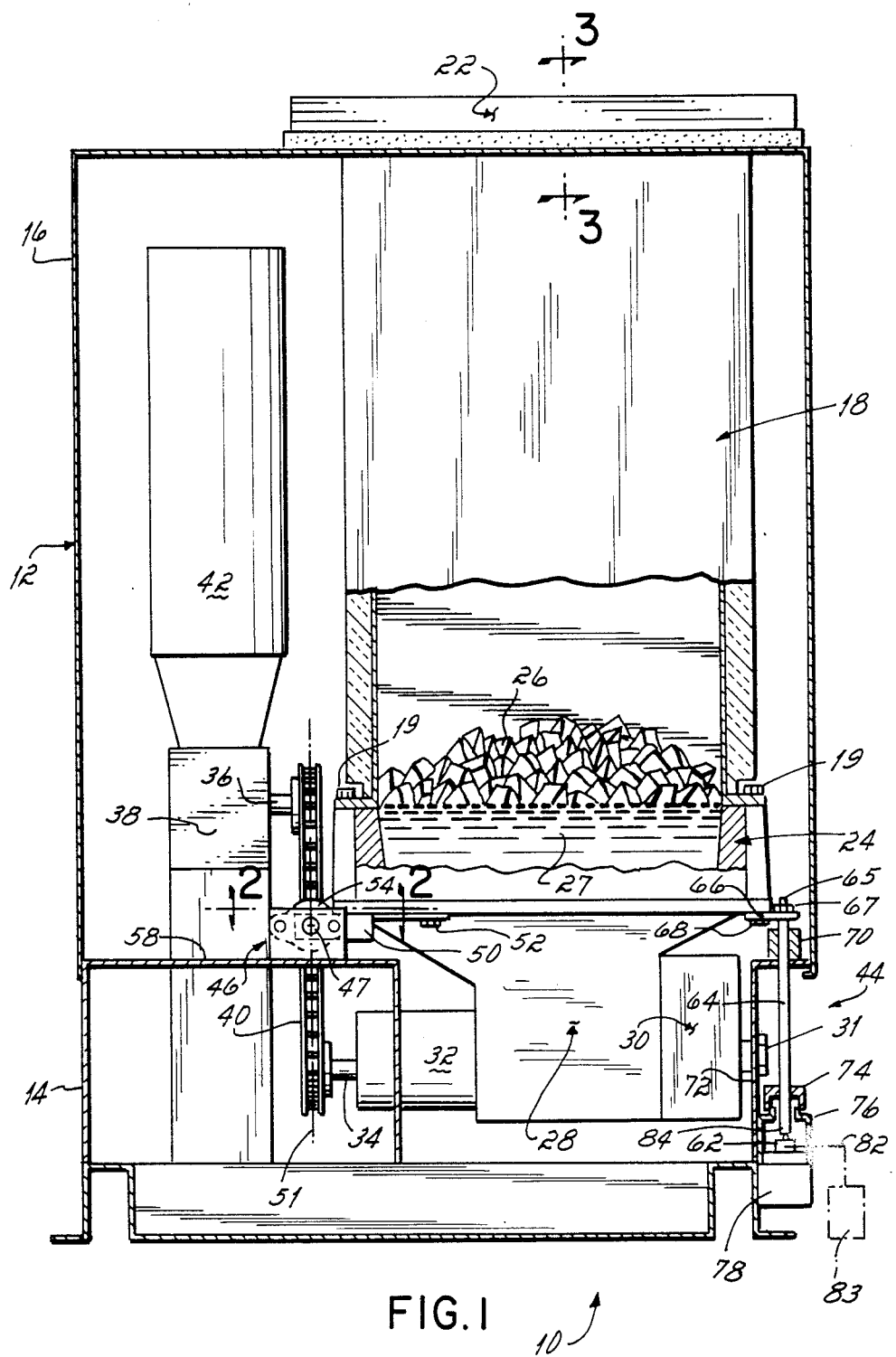
FIG. 1 is an elevational view in partial cross section of a thermoplastic melting device having the level indicator of this invention.
Figure 3:
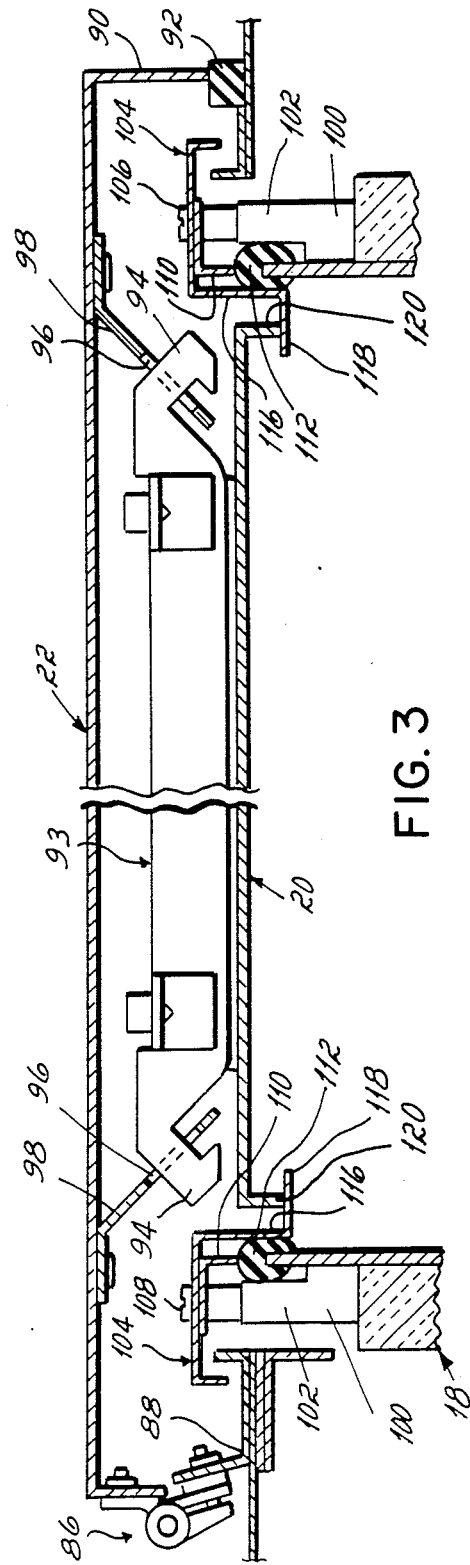
FIG. 3 is an enlarged view of the housing cover and floating tank lid of this invention taken along line 3—3 of FIG. 1.

Referring now to FIGS. 1 and 3, the thermoplastic melting apparatus 10 is of the type disclosed in U.S. Pat. No. 4,666,066 to Boccagno et al, which is incorporated by reference in its entirety herein. For purposes of describing this invention, apparatus 10 is illustrated schematically and generally comprises a housing 12 formed with a base 14 and a top portion 16. A hopper or tank 18 is mounted within the interior of the housing 12 and has an open top covered by a tank lid 20 connected to a housing cover 22 which are described in more detail below with reference to FIG. 3. The bottom of the tank 18 is connected by bolts 19 to a grid melter 24 which is effective to convert solid thermoplastic material 26 dumped into the tank 18 to the molten state 27. Mounted beneath the grid melter 24 is a reservoir 28 which receives the molten thermoplastic material therefrom and directs it into a manifold 30. The manifold 30 is connected by a fitting 31 to feed lines which lead to one or more applicators or dispensers (not shown).

The molten thermoplastic material is transferred from the reservoir 28 into the manifold 30 by a pair of gear pumps 32, 33 connected to the reservoir 28. The gear pumps 32, 33 have input shafts 34, 35, respectively, which are drivingly connected to the output shafts 36 of a pair of gear reducers 38 by drive linkages such as endless chains 40. In turn, each gear reducer 38 is driven by a motor 42. While only one of the drive units is shown, it should be appreciated that the output shaft 36 of each gear reducer 38 is drivingly connected to one of the pumps 32, 33 through a chain 40. The motion of each chain 40 applies a force to the gear pumps 32, 33 acting along the run of chains 40 as illustrated in FIGS. 1 and 2.

Figure 2:
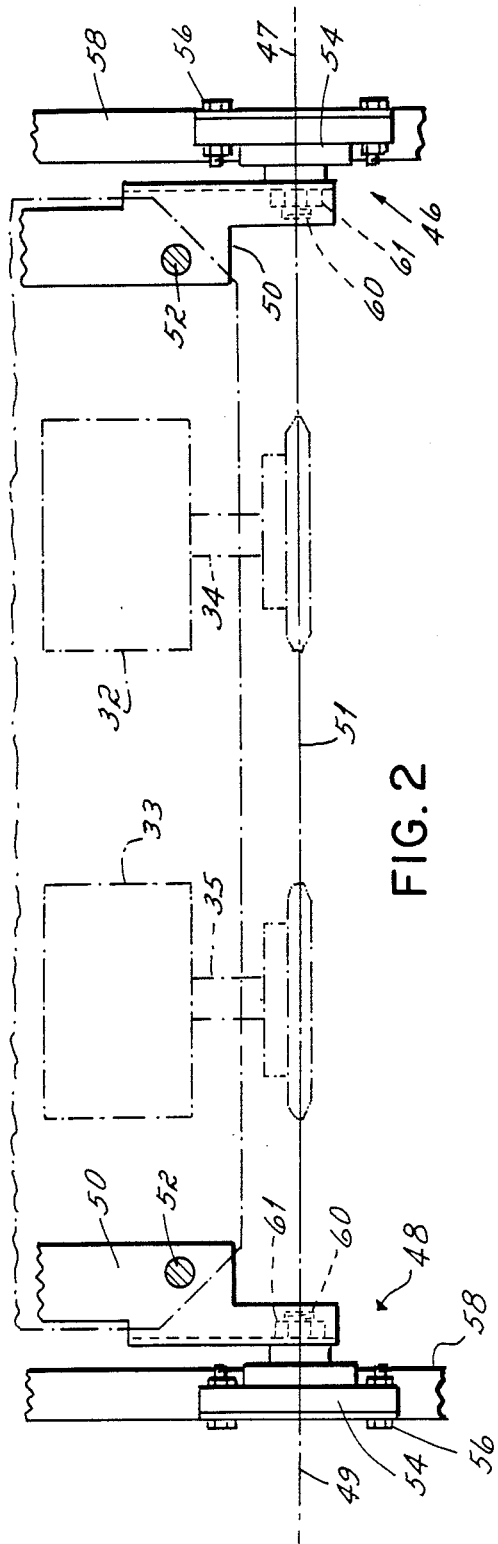
FIG. 2 is a view of the pump drive and tank pivots taken generally along line 2—2 of FIG. 1.

Referring now to FIGS. 1 and 2, the level indicator of this invention comprises structure for pivotally mounting the tank 18 with respect to the fixed housing 12, and structure for measuring the pivotal motion of the tank 18 as the quantity of thermoplastic material contained therein changes. The structure for pivotally mounting the tank 18 comprises a pair of pivots 46, 48 which are mounted to one side of the bottom of tank 18 at the front and back, respectively. Each pivot 46, 48 comprises a flange 50 secured to the underside of the tank 18 by at least one bolt 52. A bearing 54 is mounted by bolts 56 to a frame element 58 forming part of the base 14 of the housing 12. A pivot pin 60 extends from the bearing 54 and is fixedly mounted to the flange 50 by a nut 61. The tank 18 is therefore free to pivot with respect to the housing 12 with the pin 60 rotating within the fixed bearing 54.

An important aspect of this invention is that the pivots 46, 48 are mounted to the tank 18 such that the pivot axis 47 of pivot 46 is colinear with the pivot axis 49 of pivot 48 and both axes 47, 49 are disposed in a vertical plane indicated at 51 which extends through the run of each drive chain 40 between gear reducers 38 and gear pumps 32, 33. As a result, the force applied by the chains 40 to the gear pumps 32, 33 is isolated from the tank 18 and transferred directly to the fixed frame element 58 of the housing 12 via pivot pins 60 and bearings 54.

Isolation of the tank 18 from the forces applied by chains 40 is important in order to obtain an accurate reading of the quantity of thermoplastic material within the tank 18 by the measuring structure of level indicator 44. As illustrated on the righthand portion of FIG. 1, the measuring structure of the level indicator herein comprises a load cell 62 which is connected to a rod 64 having a threaded top portion 65. The top portion 65 of rod 64 is received within a flange 66 and adjustably secured thereto by a nut 67. The flange 66 is preferably mounted by a bolt 68 to the bottom of tank 18 on the side opposite pivots 46, 48. The shaft 64 extends downwardly from flange 66 through a guide 70 carried by a frame element 72 which forms part of the base 14 of housing 12.

The lower end of shaft 64 contacts the load cell 62. In order to protect the load cell 62 from dust or other contaminants which could affect its reading, the load cell 62 is mounted within an enclosure 76. A cover 74 is fixed on the rod 64 to enclose the top of the enclosure 76. The load cell 62 and enclosure 76 are, in turn, mounted upon a block 78 which is fixed to the frame element 72. A bushing (not shown) mounted in the block 78 supports a wire 82 from the load cell 62 which carries measurements from the load cell 62 to a monitor 83, shown schematically in FIG. 1.

As the tank 18 is loaded, for example, its righthand side as viewed in FIG. 1 rotates on pivots 46, 48 in a clockwise direction. In response, the shaft 64 is urged downwardly and its lower end 84 applies a force to the load cell 62. The load cell 62 is effective to measure the force applied by the shaft 64, which is proportional to the quantity and/or weight of material loaded into the tank 18, and generates a signal carried by wire 82 which provides a measurement of the contents of tank 18. The load cell 62 is calibrated so as to account for the weight of tank 18 and any other structure mounted thereto in order to ensure accurate measurement of the contents of tank 18.

Referring now to FIG. 3, the tank lid 20 and housing cover 22 are illustrated in more detail. Another important aspect of this invention is to isolate the tank lid 20 from the housing cover 22 so that any forces applied to the housing cover 22, e.g., by objects placed thereon etc., are not transmitted to the tank lid 20 and hence measured by the load cell 62.

The housing cover 22 is mounted at one end to the top portion 16 of housing 12 by a hinge 86 carried by a flange 88. The opposite side of housing cover 22 has a downturned edge 90 which rests against rubber bumpers 92, only one of which is shown in FIG. 3. A slat 93 is mounted to the front and back of the tank lid 20, only one of which is shown in FIG. 3. Each slat 93 is formed with a transversely extending arm 94 at opposite ends. Each arm 94 is received within the elongated slot 96 of a bracket 98 mounted to the underside of the housing cover 22.

With the tank lid 20 and housing cover 22 closed as shown in FIG. 3, the arms 94 of slat 93 are positioned approximately at the midpoint of the elongated slot 96 of connector 98. When the housing cover 22 is pivoted upwardly about hinge 86 to permit access to the interior of tank 18, the tank lid arms 94 engage the lower side of the elongated slot 96 in each bracket 98 so that the tank lid 20 is pivoted upwardly with the housing cover 22. If any force is applied to the housing cover 22, such as by placing an object thereon, the housing cover 22 pivots about hinge 86 and its edge 90 moves downwardly against the rubber bumpers 92. Although the housing cover 22 compresses the rubber bumpers 92 in response to such force, the tank lid arms 94 are slidable within the elongated slot 96 of the brackets 98 and does not contact housing cover 22. This isolates such force from the tank 18 and load cell 62.

The structure for mounting the tank lid 20 to the tank 18 includes an support 100 connected to the outer wall of the tank 18 formed with an upwardly extending leg 102 which clears the upper end of the tank 18. A flange 110 is mounted to the top of leg 102 of support 100 by screws 106, 108 and extends downwardly atop a rubber seal 112 mounted to the top edge of the tank 18.

A splash guard 104 having a vertical leg 116 and a horizontal leg 118 is also mounted to the support 100 by pins 106, 108. The vertical leg 116 of splash guard 104 rests against the inside of rubber seal 112 to further seal the interior of the tank 18. The horizontal leg 118 of splash guard 104 supports a lip 120 depending from the tank lid 20 so that the arm 94 of tank lid 20 is centered within the bracket slot 96 as described above.

While the invention has been described with reference to a preferred embodiment, it will be understood by those skilled in the art that various changes may be made and equivalents may be substituted for elements thereof without departing from the scope of the invention. In addition, many modifications could be made to adapt a particular situation or material to the teachings of the invention without departing from the essential scope thereof. For example, a thermoplastic melting apparatus 10 shown in the FIGS. is merely one type of melting apparatus which could be utilized with the level indicator 44 of this invention. Whereas melting apparatus 10 includes a grid melter 24 and both a reservoir 28 and manifold 30, it is contemplated that other types of melting apparatus could be employed such as those in which the walls of the hopper or tank heat the thermoplastic material or the heating means is provided within the reservoir and pumped directly therefrom to applicators or dispensers. Each of these types of melting apparatus could be adapted for use with the level indicator 44 herein and include the pivots 46, 48 aligned with the pump drive linkages, and a load cell 62.

Therefore, it is intended that the invention not be limited to the particular embodiment disclosed as the best mode contemplated for carrying out this invention, but that the invention will include all embodiments falling within the scope of the appended claims.

What is claimed is:

1. Apparatus for converting solid thermoplastic material to molten thermoplastic material, comprising:

a tank for receiving solid thermoplastic material;

melting means connected to said tank for melting the solid thermoplastic material to form molten thermoplastic material;

pump means mounted upon said tank for pumping molten thermoplastic material out of said tank;

drive means mounted independently of said tank;

linkage means drivingly connected between said pump means and said drive means, said linkage means transmitting a drive force from said drive means for operating said pump means;

pivot means connected to one side of said tank for permitting pivotal motion of said tank;

a load cell connected to said tank and being spaced from said pivot means, said load cell being effective to sense said pivotal motion of said tank and provide a corresponding measurement of the quantity of thermoplastic material carried within said tank; and said pivot means being positioned relative to said linkage means so as to isolate said load cell from forces operating said pump means.

2. The apparatus of claim 1 in which said drive means comprises a motor drivingly connected to a gear reducer having an output shaft, said pump means comprises at least one pump having an input shaft and an output communicating with the molten thermoplastic material produced by said melting means, said linkage of said drive means comprising a drive chain extending between said output shaft of said motor and said input shaft of said pump.

3. The apparatus of claim 2 in which said apparatus includes a frame, said pivot means comprising a pair of bearings fixedly mounted to said frame on one side of the bottom of said tank, each of said bearings pivotally mounting a pin connected to said tank for permitting pivotal motion of said tank with respect to said frame.

4. The apparatus of claim 3 in which said load cell is mounted to said bottom of said tank on the side opposite said bearings, said tank pivoting upon said bearings in proportion to the quantity of thermoplastic material contained therein, said load cell sensing said pivotal motion and producing a signal in response thereto to measure said quantity of thermoplastic material contained in said tank.

5. The apparatus of claim 1 in which said load cell is fixedly mounted to a support, and a rod extends between the bottom of said tank and said load cell on the side of said tank opposite said pivot means, said rod being movable in response to pivoting of said tank to apply a force to said load cell which is proportionate to the quantity of thermoplastic material contained within said tank.

6. Apparatus for converting solid thermoplastic material to molten thermoplastic material, comprising:

a housing having an interior formed with an open top, said housing having a top cover for opening and closing said interior;

a tank mounted within said interior of said housing, said tank being formed with an interior adapted to receive thermoplastic material, said tank having a lid for opening and closing said interior;

connector means for mounting said lid of said tank to said cover of said housing so that said lid is isolated from forces applied to said cover in a direction toward said interior of said tank;

melting means connected to said tank for melting the solid thermoplastic material therein to form molten thermoplastic material;

pump means communicating with said melting means for pumping molten thermoplastic material;

drive means having linkage drivingly connected to said pump means, said linkage producing a drive force for operating said pump means acting between said drive means and said pump means;

pivot means connected to one side of said tank for permitting pivotal motion of said tank, said pivot means having a pivot axis located in a plane containing said drive force produced by said linkage;

a load cell connected to said tank and being spaced from said pivot means, said load cell being effective to sense said pivotal motion of said tank and provide a corresponding measurement of the quantity of thermoplastic material carried within said tank.

7. The apparatus of claim 6 in which said top cover of said housing is hinged at one end for movement between an open position and a closed position, the opposite end of said top cover being engagable with a resilient pad mounted to said housing when said top cover is in said closed position.

8. The apparatus of claim 6 in which said connector means comprises:

a slat having an arm at each end, said slat being mounted to said lid of said tank;

a pair of brackets mounted to the bottom of said housing cover at each side, each of said brackets being formed with an elongated slot which receives one of said arms of said tank lid;

said housing cover being movable toward said tank lid in response to the application of forces to said housing cover, said arms of said slat of said tank lid being slidable within said elongated slot in said brackets so as to avoid contact between said tank lid and said housing cover.

9. The apparatus of claim 6 in which said tank further includes sealing means, comprising:

a rubber seal mounted to the top edge of said tank;

a support mounted to said tank;

a flange carried by said support, said flange being formed with a leg for contacting said rubber seal.

10. The apparatus of claim 9 in which said sealing means comprises a splash plate mounted to said support and extending into said interior of said tank, said splash plate abutting said rubber seal for sealing said interior of said tank.

* * * * *